Jan. 15, 1929.  1,698,922
A. D. RHODES
RIVET SETTING MACHINE
Filed July 9, 1928  3 Sheets-Sheet 3
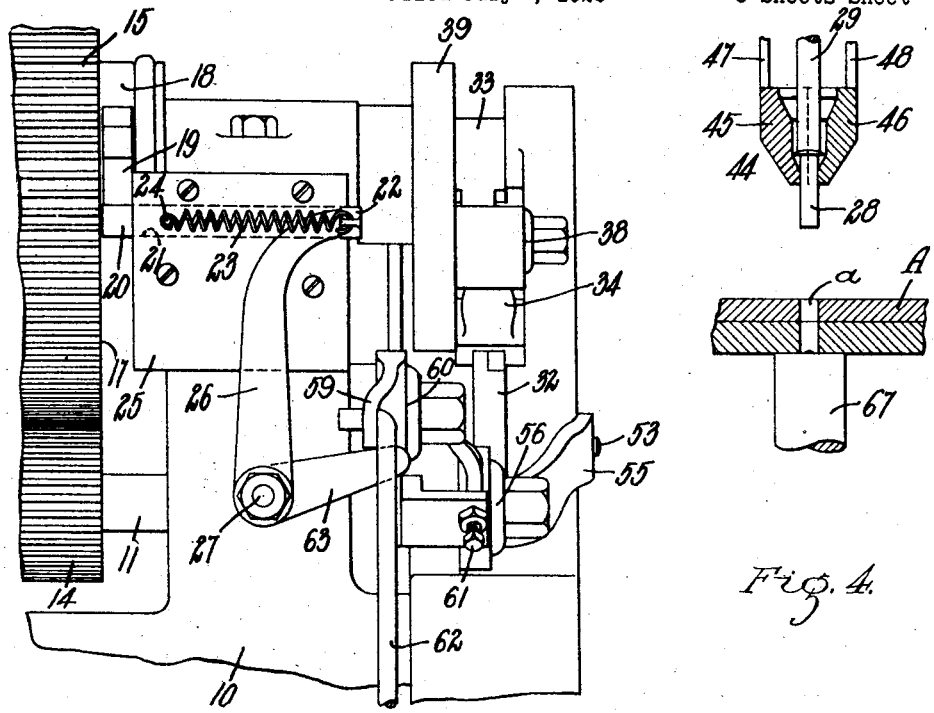
Fig. 3.
Fig. 4.
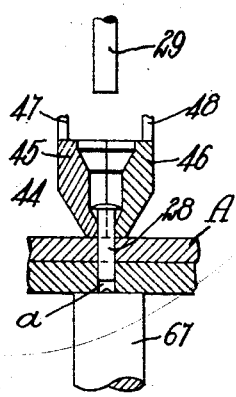
Fig. 5.
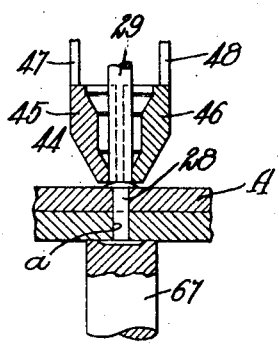
Fig. 6.
Inventor:
Austin D. Rhodes.
by Charles S. Gooding, Atty.

Patented Jan. 15, 1929.

1,698,922

UNITED STATES PATENT OFFICE.

AUSTIN D. RHODES, OF WALTHAM, MASSACHUSETTS, ASSIGNOR TO JUDSON L. THOMSON MANUFACTURING CO., OF WALTHAM, MASSACHUSETTS, A CORPORATION OF MASSACHUSETTS.

RIVET-SETTING MACHINE.

Application filed July 9, 1928. Serial No. 291,150.

This invention relates to a rivet setting machine, and particularly to a machine for securing together two or more articles or layers of material in which the holes for receiving the rivets have previously been formed.

The object of the invention is to provide a machine embodying therein a manually operated means for inserting a rivet into a hole provided therefor in the work, after which a power driven mechanism is started in operation by the manually operated means to operate the driver to clinch the rivet to the work.

The invention consists in a rivet setting machine as set forth in the following specification and particularly as pointed out in the claims thereof.

Referring to the drawings:

Fig. 3 is an enlarged detail elevation of the clutch operating mechanism.

Figs. 4, 5 and 6 are enlarged detail vertical sections illustrating the various steps taken in inserting the rivet in the work and clinching the same thereto.

Like numerals refer to like parts throughout the several views of the drawings.

Figure 1:
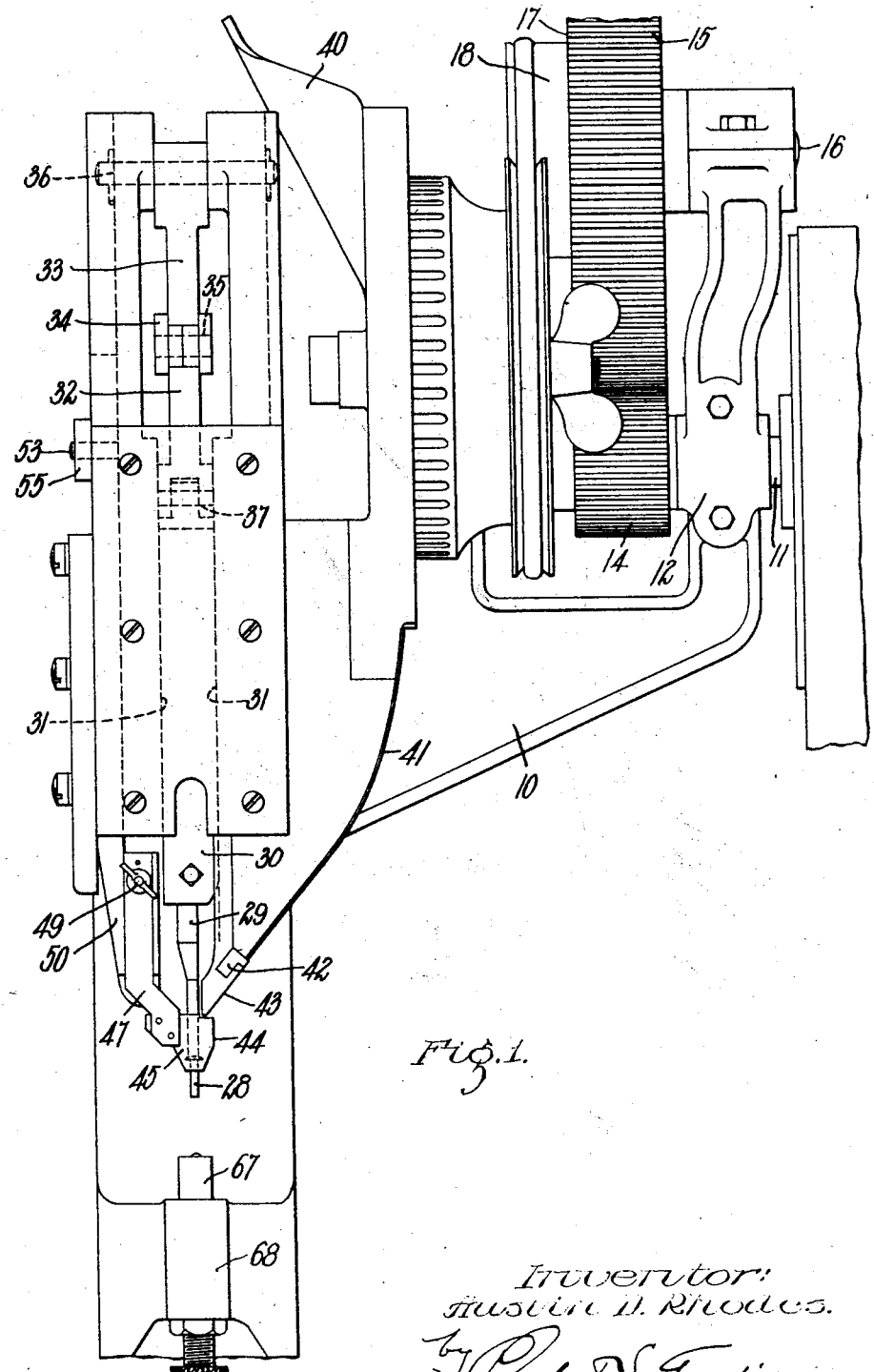
Figure 1 represents a front elevation of a rivet setting machine embodying my invention, portions of the base of the machine and driving pulley being broken away to save space in the drawings.

In the drawings, 10 represents the frame of the machine and 11 is a driving shaft journalled to rotate in bearings 12 and 13 provided in the frame 10. Rigidly fastened to the shaft 11 is a driving pinion 14 which meshes with a gear 15 which is journalled to rotate upon a shaft 16 and forms one member of a clutch 17. Another member 18 of the clutch is fastened to the shaft 16. The clutch members 17 and 18 are clutched together as one piece by a suitable mechanism not shown in its entirety in the drawings, but well known to those skilled in the art, this mechanism being operated from a treadle also not shown in the drawings by means of a treadle rod and intermediate mechanism hereinafter to be more fully described.

A locking dog, or arm, 19 is pivoted to the clutch member 18 and a tripper slide 20 is slidably mounted in ways 21 provided in the frame 10 and when the tripper slide 20 is in engagement with the locking dog 19, the clutch member 15 will rotate freely without rotating the shaft 16.

Projecting laterally from the tripper slide 20 at one end thereof is an arm 22, and the slide 20 is normally held in a position to engage the locking dog 19 by a spring 23, one end of which is secured to the arm 22, the other end being secured to a pin 24 fastened to a plate 25, in turn fastened to the frame 10 and provided for the purpose of holding the slide 20 in the ways 21.

The slide 20 is thrown out of engagement with the locking dog 19 by a bell crank lever 26 pivoted at 27 to the frame 10, the upper extremity of one of the arms of said bell crank lever engaging the arm 22 of the slide 20.

Rivets 28 which are of the well known tubular type are driven during the setting operation by a driver 29, which is fastened to a slide 30 guided in ways 31 in the frame 10. The slide 30 has a vertical reciprocatory motion imparted thereto by a pair of toggle links 32 and 33 which are connected to a connecting rod 34 by a pivotal pin 35. The toggle link 33 is pivoted at 36 to the frame of the machine, while the toggle link 32 is connected to the upper end of the slide 30 by a pin 37. The connecting rod 34 is pivotally connected at its opposite end to a crank pin 38 which is fastened to a cam plate 39, said cam plate in turn being fastened to the shaft 16. By this mechanism, a reciprocatory motion is imparted to the slide 30 and hence to the driver 29.

The rivets 28 are fed from a hopper 40 down a raceway 41 and are separated by a slide 42 to be fed down a raceway 43 into a carrier 44 which consists of two members 45 and 46 fast to springs 47 and 48 respectively, said springs being fastened by a bolt 49 to a carrier slide 50. The carrier slide 50 has a pin 51 fast thereto which projects through a slot 52 in the frame of the machine and constitutes a stop to limit the upward movement of said slide. The slide 50 also has a pin 53 fast thereto which projects into a slot 54 in a lever 55 which is pivoted at 56 to the frame of the machine, and at its opposite end is provided with a cam roll 57 which bears against the cam 39. A spring 58 is fastened at one end to the lever 55 and at its other end to the frame and acts to hold the roll 57 in engagement with the cam 39, except at such times as when said lever is operated by a lever 59, which is pivoted at 60 to the frame 10.

The lever 59 has a screw 61 adjustably mounted therein at one end thereof and positioned to engage the lever 55. The opposite end of the lever 59 is connected by a rod 62 with the foot treadle previously mentioned but which is not illustrated in the drawings. The bell crank lever 26 embodies therein an arm 63 which is so positioned that when the lever 59 is operated to move the rivet carrier 44 downwardly, that it will engage the upper edge of the arm 63 of the bell crank lever 26, causing the latter to eventually move the tripper slide 20 out of engagement with the locking dog 19.

The rivets 28 are transferred from the raceway 41 to the raceway 43 one at a time by the slide 42 which is operated by a lever 64 pivoted at 65 to the frame 10, said lever 64 having a rocking movement imparted thereto in one direction by a spring 66 and in the opposite direction by a projection which is formed upon the connecting rod 34. The operation of the slide 42 in transferring the rivets from the raceway 41 to the raceway 43 is well known to those skilled in the art, and as it forms no part of this invention, requires no further description.

The work A which may consist of any number of layers of sheet material, or articles, which preferably are constructed of different materials and in which holes $a$ have previously been formed, is supported upon an anvil 67 which, in turn, is adjustably supported upon an arm 68 forming a portion of the frame 10.

The general operation of the mechanism hereinbefore specifically described is as follows:—After the work A has been placed upon the anvil 67 with the holes $a$ of the various layers of material comprising said work aligning with each other and also centrally located upon the anvil 67, the operator places his foot upon the treadle and moves the same downwardly until the rivet 28 that is located within the rivet carrier 44 has been positioned in the aligning holes provided in the work.

Figure 2:
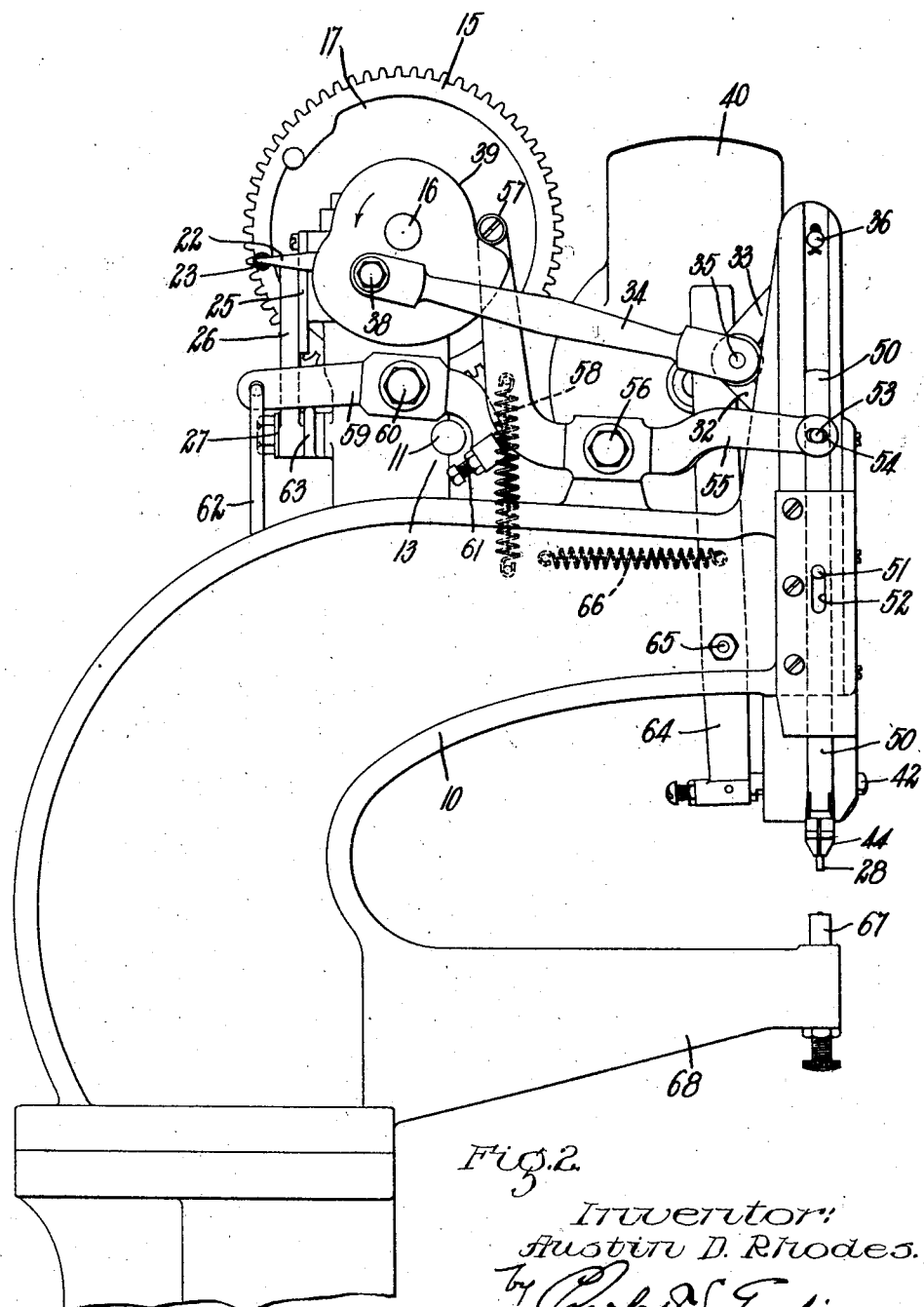
Fig. 2 is a side elevation of the machine as viewed from the left hand side of Fig. 1.

During this downward movement of the foot treadle, the treadle rod 62 is moved downwardly rocking the lever 59 which, in turn, imparts a rocking movement to the lever 55 moving the slide 50 downwardly in the frame 10, and also moving the cam roll 57 out of engagement with the cam 39. During the rocking movement of the lever 59 the lower edge of said lever will engage the upper edge of the arm 63 of the bell crank lever 26, and the latter will cause the tripper slide 20 to be moved beneath the locking dog 19, but not entirely out of engagement therewith until after the rivet 28 has been positioned within the work A when a further downward movement of the treadle will cause the tripper slide 20 to be moved out of engagement with the locking dog, whereupon the clutch members 17 and 18 will immediately be locked together in a well known manner rotating the shaft 16 and causing the cam plate 39 to be rotated in the direction of the arrow, Fig. 2, to operate the driver 29 in a well known manner to clinch the rivet to the work.

As soon as the clutch members 17 and 18 have been locked together, the operator removes his foot from the treadle, thereby permitting the tripper slide 20 to return to its normal position, and as soon as the driving mechanism has made one complete revolution, the locking dog 19 will again engage the tripper slide, causing the machine to immediately stop. After the foot of the operator has been removed from the treadle, the function of the cam surface upon the periphery of the cam plate 39 is to hold the rivet carrier 44 in its lowermost position until the proper time when the spring 58 will act to again raise said carrier. Furthermore, if during the manual operation of the rivet carrier slide the rivet carrier 44 has not been moved to its lowermost position before the tripper slide 20 is disengaged from the locking dog 19, the cam plate 39 upon being driven by power will complete the downward movement of said rivet carrier to its lowermost position.

While it has been found convenient to attach the connecting rod 34 to the cam plate 39 and utilize the latter as a crank for driving the connecting rod 34, it is evident that said crank may be constructed independent of the cam plate 39 and rigidly fastened to the shaft 16.

I claim:—

1. A rivet setting machine having, in combination, an anvil, a driver oppositely disposed thereto, a rivet carrier, manually operated means to move said carrier to position a rivet located therein in a hole provided in the work, and power driven mechanism subsequently rendered effective by said manually operated means to operate the driver to clinch the rivet to the work.

2. A rivet setting machine having, in combination, an anvil, a driver oppositely disposed thereto, a rivet carrier, power driven means for actuating said rivet carrier and driver, a clutch for said driving means, and manually operated means to move said carrier to position a rivet located therein in a hole provided in the work, said clutch being operated subsequently by said manually operated means to cause said power driven means to operate the driver to clinch the rivet to the work.

3. A rivet setting machine having, in combination, an anvil, a driver oppositely disposed thereto, a rivet carrier, a slide to which said carrier is fastened, a lever connected to said slide, a cam for rocking said lever, manually operated means to rock said lever independently of said cam to position a rivet located within the carrier in a hole provided in the work, and power driven mechanism including said cam subsequently rendered effective by said manually operated means to operate the driver to clinch the rivet to the work.

4. A rivet setting machine having, in combination, an anvil, a driver oppositely disposed thereto, a rivet carrier, a slide to which said carrier is fastened, a lever connected to said slide, a cam for rocking said lever, a manually operated lever engaging said first-mentioned lever and adapted to rock the latter independently of said cam to position a rivet located within the carrier in a hole provided in the work, and power driven mechanism including said cam subsequently rendered effective by said manually operated lever to operate the driver to clinch the rivet to the work.

5. A rivet setting machine having, in combination, an anvil, a driver oppositely disposed thereto, a rivet carrier, a slide to which said carrier is fastened, a lever connected to said slide, power operated means for actuating said lever and driver, a clutch for said power operated means, and manually operated means to rock said lever independently of said power operated means to position a rivet located within the carrier in a hole provided in the work, said clutch subsequently being operated by said manually operated means to render the power means effective to operate the driver to clinch the rivet to the work.

6. A rivet setting machine having, in combination, an anvil, a driver oppositely disposed thereto, a rivet carrier, a slide to which said carrier is fastened, a lever connected to said slide, power operated means for actuating said lever and driver, a clutch for said power operated means, and a manually operated lever to rock said first-mentioned lever independently of said power operated means to position a rivet located within the carrier in a hole provided in the work, said clutch subsequently being operated by said manually operated lever to render said power means effective to operate the driver to clinch the rivet to the work.

7. A rivet setting machine having, in combination, an anvil, a driver oppositely disposed thereto, a rivet carrier, power driven means for actuating said driver, a clutch for said driving means, and manually operated means to move said carrier to position a rivet located therein in a hole provided in the work, said clutch being operated subsequently by said manually operated means to cause said power driven means to operate the driver to clinch the rivet to the work.

In testimony whereof I have hereunto set my hand.

AUSTIN D. RHODES.